(12) United States Patent
Appukuttan et al.

(10) Patent No.: US 9,759,130 B2
(45) Date of Patent: Sep. 12, 2017

(54) GAS TURBINE ENGINE WITH COOLING SYSTEM

(71) Applicant: ROLLS-ROYCE PLC, London (GB)

(72) Inventors: Ajith Appukuttan, Derby (GB); Andrew Martin Rolt, Derby (GB); Anthony John Moran, Nuneaton (GB)

(73) Assignee: ROLLS-ROYCE plc, London (GB)

( * ) Notice: Subject to any disclaimer, the term of this patent is extended or adjusted under 35 U.S.C. 154(b) by 637 days.

(21) Appl. No.: 14/033,878

(22) Filed: Sep. 23, 2013

(65) Prior Publication Data

US 2014/0090395 A1    Apr. 3, 2014

(30) Foreign Application Priority Data

Sep. 28, 2012   (GB) .................................. 1217332.4

(51) Int. Cl.
   *F02C 7/141*    (2006.01)
   *F02C 7/18*     (2006.01)
   *F02C 7/224*    (2006.01)

(52) U.S. Cl.
   CPC .............. *F02C 7/141* (2013.01); *F02C 7/185* (2013.01); *F02C 7/224* (2013.01); *Y02T 50/671* (2013.01); *Y02T 50/675* (2013.01)

(58) Field of Classification Search
   CPC .. F02C 7/224; F02C 7/185; F02C 7/18; F02C 6/08; F02C 9/18
   See application file for complete search history.

(56) References Cited

U.S. PATENT DOCUMENTS

| | | | | |
|---|---|---|---|---|
| 5,233,823 A | * | 8/1993 | Day | F02C 3/30 60/39.59 |
| 6,182,435 B1 | | 2/2001 | Niggemann et al. | |
| 6,253,554 B1 | * | 7/2001 | Kobayashi | F02C 7/12 60/736 |
| 6,315,815 B1 | * | 11/2001 | Spadaccini | B01D 19/0031 95/46 |
| 6,393,823 B1 | * | 5/2002 | Badeer | F02C 7/228 60/39.58 |
| 6,939,392 B2 | * | 9/2005 | Huang | B01D 19/0031 55/385.1 |
| 7,153,343 B2 | * | 12/2006 | Burlatsky | B01D 19/0031 95/265 |

(Continued)

FOREIGN PATENT DOCUMENTS

EP    0 584 958        3/1994
EP    0 638 715 A1    2/1995

(Continued)

OTHER PUBLICATIONS

Search Report issued in British Application No. 1217332.4 dated Dec. 11, 2012.

*Primary Examiner* — Carlos A Rivera
*Assistant Examiner* — Stefan Ibroni
(74) *Attorney, Agent, or Firm* — Oliff PLC (57) ABSTRACT

A cooling system for a gas turbine engine. The system includes a fuel air heat exchanger with a fuel passage that is in thermal contact with an engine cooling air passage. The system further includes a fuel deoxygenator located upstream of the fuel air heat exchanger and configured to deliver deoxygenated fuel to the fuel air heat exchanger fuel passage. The system also includes a valve configured to moderate engine cooling air flow to the engine cooling air passage.

12 Claims, 4 Drawing Sheets

(56) References Cited

U.S. PATENT DOCUMENTS

| | | | | |
|---|---|---|---|---|
| 7,251,925 B2* | 8/2007 | Paradise | ............... | F02C 7/228 60/39.281 |
| 8,056,345 B2* | 11/2011 | Norris | ............... | F02C 7/14 60/736 |
| 2005/0241320 A1* | 11/2005 | Blonn | ............... | F02C 7/224 60/782 |
| 2010/0154434 A1* | 6/2010 | Kubota | ............... | F02C 7/18 60/785 |
| 2011/0016870 A1* | 1/2011 | Kashler | ............... | F02C 6/18 60/772 |
| 2011/0088405 A1* | 4/2011 | Turco | ............... | F01D 5/081 60/782 |

FOREIGN PATENT DOCUMENTS

| | | |
|---|---|---|
| EP | 1 154 135 A2 | 11/2001 |
| EP | 1 544 437 A2 | 6/2005 |
| EP | 1 559 883 A2 | 8/2005 |
| EP | 1 643 113 A2 | 4/2006 |
| WO | WO 02/16743 A1 | 2/2002 |
| WO | WO 2011/007303 A1 | 1/2011 |

* cited by examiner

GAS TURBINE ENGINE WITH COOLING SYSTEM

The present invention relates to a gas turbine engine, and in particular the invention relates to a gas turbine engine having a fuel air heat exchanger to provide cooled air to an engine component, and a method of moderating cooled air provided to the engine component.

BACKGROUND TO THE INVENTION

Figure 1:
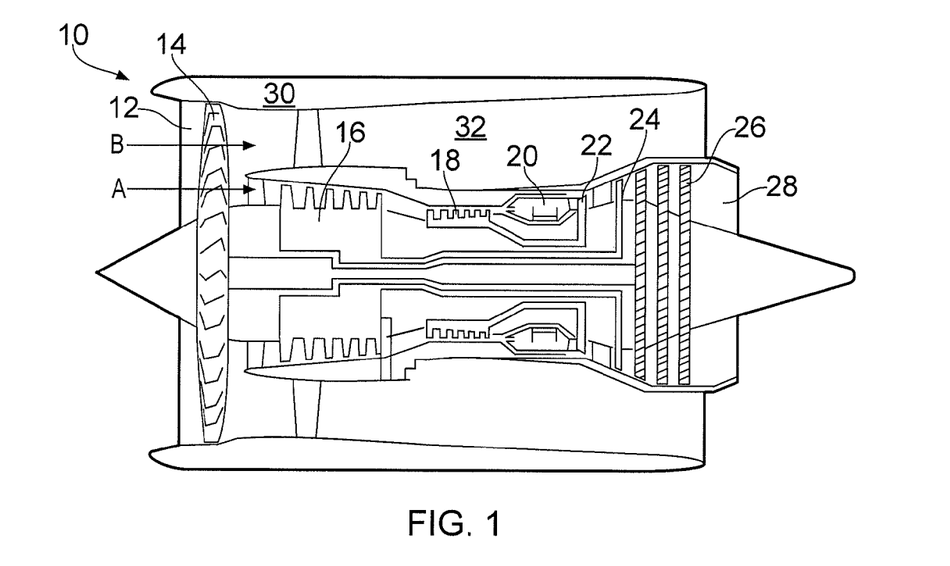
FIG. 1 is diagrammatic side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, nozzle guide vanes 23, an intermediate pressure turbine 24, a low pressure turbine 26 and an exhaust nozzle 28. A nacelle 30 surrounds the gas turbine engine 10 and defines, in axial flow B, a bypass duct 32.

As well as flowing directly to the combustor 20 for combustion with fuel, a portion of the air flow A flowing through intermediate and high pressure compressors 16, 18 is diverted and used to cool the engine components such as turbine blades 22, 24, 26 and nozzle guide vanes 23 (NGVs). However, as air flows through the intermediate and high pressure compressors 16, 18, the compression of the air causes the temperature of the air to rise to around 700° C. or higher. This reduces the cooling capacity of a given mass of air, since the air is at a higher temperature before it is delivered to the turbine components 22, 24, 26 and NGVs 23. As a result, more air is required to cool the turbines to a required temperature, resulting in reduced efficiency of the engine 10.

It is therefore desirable to cool engine cooling air after it has been compressed by the compressors 16, 18 before it is used to cool engine components downstream, such as components 22, 24, 26, 23. One prior system for providing cooled engine cooling air comprises a fuel air heat exchanger. Relatively hot engine cooling air from the compressors 16, 18 and relatively cool liquid hydrocarbon fuel supplied from a fuel tank (not shown) is passed through a heat exchanger matrix such that the engine cooling air is in thermal contact with the fuel. Heat from the engine cooling air is transferred to the fuel by the heat exchanger as the air and the fuel flow through the matrix. The fuel then flows to the combustor 20 where it is mixed with the remainder of the air from the compressors 16, 18 and burnt in a conventional manner.

However, the useable cooling capacity of hydrocarbon fuel is limited by a "critical temperature" above which the fuel may lose its required properties. In the absence of dissolved oxygen, the fuel will decompose (i.e. undergo pyrolysis) at temperatures above a decomposition temperature of the fuel. The decomposition temperature of the fuel is specific to the particular fuel. In the case of jet A1 hydrocarbon fuel, the decomposition temperature is in the region of 371° C. Furthermore, in the presence of dissolved oxygen, insoluble compounds known as "coke" will be formed where the fuel is heated to a temperature above an oxidation temperature. The oxidation temperature will again generally be dependent on the particular fuel, and on the oxidation state of the fuel, i.e. the amount of dissolved oxygen present in the fuel. In jet A1 hydrocarbon fuel having a dissolved oxygen level typical in aviation applications, coke may begin to form in fuel that is heated to a temperature above 150° C. Coke deposits can cause degradation of fuel delivery performance by blocking or partially blocking fuel lines and/or injectors.

One proposed solution to the above problem is to deoxygenate the fuel prior to delivery of the fuel to the fuel air heat exchanger using a fuel deoxygenator, either by deoxygenating the fuel prior to fuelling the aircraft, or by deoxygenating the fuel from the fuel tank prior to passing the fuel through the heat exchanger (as outlined for example in EP 1559883). The coking temperature of the fuel is thus increased, and the fuel can then be heated to a higher temperature before coking occurs, thereby permitting more heat to be transferred from the air to the fuel.

However, in modern gas turbine engines, the temperature of the air flow may nevertheless be sufficient to raise the temperature of the deoxygenated fuel in the fuel line to a temperature above the critical temperature (i.e. either the coking temperature or the pyrolysis temperature). It has been found that the fuel may also become partially re-oxygenated (i.e. the amount of dissolved oxygen will increase) after a period of time.

The present invention seeks to address some or all of the above problems.

SUMMARY OF THE INVENTION

According to a first aspect of the present invention there is provided a gas turbine engine comprising a combustor and a turbine having cooling passages, the gas turbine engine further comprising:
  an air line configured to provide engine cooling air to the cooling passages of the turbine;
  a fuel line configured to provide fuel to the combustor;
  a fuel air heat exchanger configured to exchange heat from air in the air line to fuel in the fuel line;
  a valve configured to moderate air flow rate through the heat exchanger; and a controller configured to control the valve to moderate airflow rate to maintain fuel temperature in the fuel line below a critical temperature.

Advantageously, the invention provides a gas turbine engine which can utilise a fuel air heat exchanger to provide cooled cooling air to air cooled components, while preventing pyrolysis or coking of the fuel.

The critical temperature may comprise a fuel oxidation temperature or a fuel pyrolysis temperature. In general, the critical temperature will be the lower of the pyrolysis and coking temperatures of the fuel in the fuel line. Fuel oxidation temperature may be at least partly dependent on the amount of oxygen dissolved in the fuel. The controller can therefore operate the valve to prevent fuel degradation irrespective of the amount of oxygen dissolved in the fuel.

The gas turbine engine may comprise a fuel deoxygenator configured to deoxygenate fuel in the fuel line, the deoxygenator being located upstream of the fuel air heat exchanger. It has been found that deoxygenated fuel can reabsorb oxygen from the atmosphere relatively quickly. Therefore by providing a deoxygenator configured to deoxygenate fuel within the fuel line, the fuel can be deoxygenated shortly before use in the heat exchanger, thereby reducing the amount of dissolved oxygen present in the fuel line in the air fuel heat exchanger.

The controller may be configured to control the valve in response to fuel flow rate through the fuel line. The controller may comprise one or more of a temperature sensor, an engine core air flow sensor a fuel flow rate sensor and an fuel oxygen sensor. The controller may be configured to reduce the engine cooling air flow where the fuel flow falls below a predetermined value, and may be configured to increase the engine cooling air flow where the fuel flow rises above a predetermined value. The fuel flow rate may be directly measured or inferred or calculated from other measurements.

It has been found that, where the gas turbine engine comprises a fuel deoxygenator configured to deoxygenate fuel in the fuel line, the oxidation state of the fuel may be at least partly dependent on flow rate of the fuel through the fuel line. This is because the oxidation level of the fuel in the fuel line will be dependent on the time between the fuel being deoxygenated and being burnt in the compressor, as oxygen is reabsorbed in the fuel after it has passed through the deoxygenator. Therefore where the fuel flow rate increases, the fuel spends a shorter duration in the fuel line, and will therefore have less dissolved oxygen, and a correspondingly higher coking temperature, which may in turn lead to a higher critical temperature. Furthermore, where the fuel flow rate is higher, a greater mass of fuel will travel through the heat exchanger during a given time. The fuel will therefore be able to absorb a greater amount of heat before reaching the critical temperature.

The controller may be configured to control the valve in response to a fuel temperature measurement. The controller may be configured to increase the engine cooling air flow where the fuel temperature falls below a predetermined value, and may be configured to reduce the engine cooling air flow where the fuel flow rises above a predetermined value. The predetermined value may be the critical temperature, or may be a temperature related to the critical temperature, for example, a set amount below the critical temperature.

Alternatively or in addition, the controller may be configured to control the valve in response to an engine component temperature or working fluid temperature. The working fluid temperature may comprise a nozzle guide vane inlet temperature such as the high pressure nozzle guide vane inlet temperature (T40). Alternatively, the working fluid temperature may comprise a compressor air temperature, and may comprise the temperature of the compressor offtake air used in the fuel air heat exchanger. The temperature may be directly measured, or may be inferred or calculated from indirect measurements. The engine component temperature or working fluid temperature can be indicative of a number of aspects of engine operation, such as engine component cooling requirements, and fuel demand. Controlling the valve on the basis of an engine component temperature may therefore provide a simple but effective means for controlling the valve.

The gas turbine engine may comprise a staged combustor having a main fuel injector and a pilot fuel injector. The main fuel injector may be fluidically connected to a primary fuel line, and the pilot fuel injector may be fluidically connected to a secondary fuel line.

The fuel air heat exchanger may comprise a primary fuel passage and a secondary fuel passage fluidically connected to the primary fuel line and the secondary fuel line respectively. Each of the primary and secondary fuel line may be in thermal contact with a respective primary and secondary engine cooling air passage. The valve may be configured to moderate engine cooling air flow to one or more of the cooling air passages. A second valve may be configured to moderate engine cooling air flow to the secondary engine cooling air passage. Where first and second valves are provided, the controller may be configured to control one or both valves in response to a measurement of one or more of fuel flow rate, fuel temperature, or critical temperature through each respective first and second fuel passage.

By providing separate primary and secondary engine cooling air passages for the primary and secondary fuel passages in a staged combustion system, the engine cooling air provided to the primary and secondary fuel flows can be controlled independently. In particular, the valve may be configured to reduce or shut off air flow to the air passage in thermal contact with the primary fuel passage, which may be more susceptible to coking than the secondary fuel passage during low power operating conditions due to stagnant fuel in the primary fuel passage.

The cooling system may comprise a bypass passage for directing engine cooling air around the heat exchanger, the valve being configured to moderate the engine cooling air flow to the engine cooling air passage and to the bypass passage.

By providing a bypass passage, engine cooling airflow can still be provided to the cooled components at engine conditions when the engine cooling air flow passing through the fuel air heat exchanger is reduced or completely shut off by the valve.

According to a second aspect of the present invention there is provided a method of moderating engine component cooling air flow through a fuel air heat exchanger of a gas turbine engine in accordance with the first aspect of the invention, the method comprising:

moderating air flow through the fuel air heat exchanger to maintain fuel temperature in a fuel line below a critical temperature.

The method may comprise moderating the airflow in response to engine conditions such as an engine component temperature or working fluid temperature. The engine component temperature or working fluid temperature may comprise a nozzle guide vane inlet temperature such as the high pressure nozzle guide vane inlet temperature (T40). The temperature may be directly measured, or may be inferred or calculated from indirect measurements.

The method may comprise controlling the valve in response to a measurement of any of fuel flow rate through the fuel passage, fuel temperature in the fuel passage relative to a critical temperature of the fuel in the fuel line. The method may comprise reducing the engine cooling air flow where the fuel flow falls below a first predetermined value, and increasing the engine cooling air flow where the fuel flow rises above a second predetermined value.

The method may comprise controlling the valve in response to the temperature of the fuel flowing through the fuel line in use. The method may comprise increasing the engine cooling air flow where the fuel temperature falls below a first predetermined value, and reducing the engine cooling air flow where the fuel flow rises above a second predetermined value. The second predetermined value may be related to the critical temperature.

BRIEF DESCRIPTION OF THE DRAWINGS

The present invention will be more fully described by way of example with reference to the accompanying drawings, in which.

DETAILED DESCRIPTION OF THE PREFERRED EMBODIMENT

FIG. 1 shows a gas turbine engine 10. The gas turbine engine 10 generates heat in the combustor 20 by burning fuel with air provided by the fan 14 and the compressor 16, 18. This heat is transmitted to engine fluids such as fuel, oil and air, and is managed by a cooling system 60, shown schematically in FIG. 3.

Figure 3:
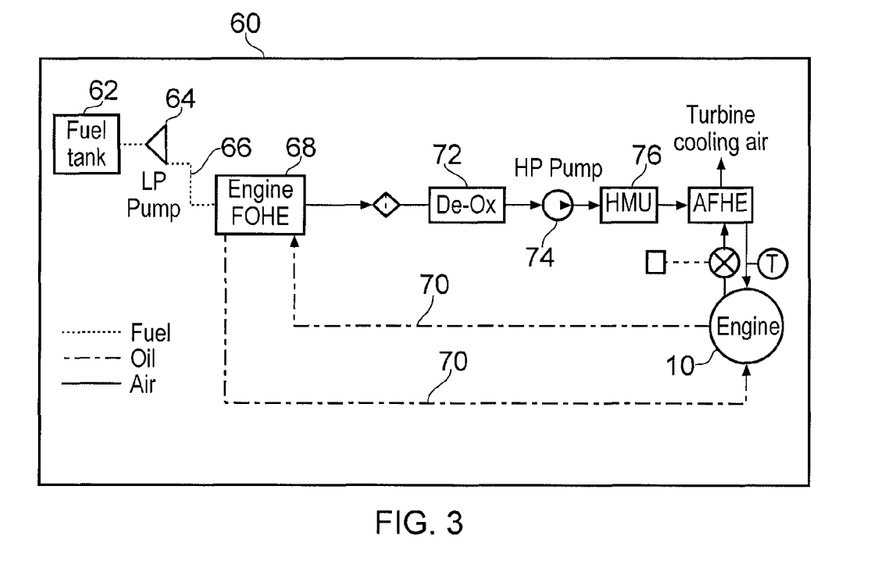
FIG. 3 is a schematic view of part of an engine cooling system of a gas turbine engine.

The cooling system 60 includes a fuel tank 62 which contains a liquid fuel. Examples of typical liquid fuels include hydrocarbon based fuels such as kerosene, jet A1 and diesel. Fuel stored in the fuel tank 62 will also generally contain impurities such as dissolved oxygen.

The fuel is first pumped by a low pressure fuel pump 64 through a fuel line 66 to an engine fuel oil heat exchanger 68. The fuel line 66 passes through a fuel oil heat exchanger 68. The fuel oil heat exchanger 68 includes a heat exchange matrix comprising fuel and oil passages. Hot oil from the engine 10 is supplied through an oil line 70 through the fuel oil heat exchanger 68. The heat from the hot oil heats the fuel in the fuel line 66, thereby cooling the oil in the oil line 7, which is then returned to the engine 10. In some embodiments however, the fuel oil heat exchanger 68 may be omitted.

Once the fuel in the fuel line 66 has passed through the fuel oil heat exchanger 68, it is then passed to a de-oxygenator 72 where the fuel is at least partially de-oxygenated. In alternative arrangements the de-oxygenator may be omitted, in which case the fuel may be deoxygenated prior to fuelling the aircraft or be deoxygenated in the aircraft fuel tank. In further embodiments, the de-oxygenator 72 may be located upstream of the fuel oil heat exchanger 68 where that is present.

It has been found that, once deoxygenated, liquid hydrocarbon fuel reabsorbs oxygen relatively quickly. This may occur particularly in either the fuel line 66 downstream of the de-oxygenator 72, or within the de-oxygenator 72 itself. It has also been found that, during some engine conditions, fuel may become sufficiently re-oxygenated after passing through the de-oxygenator 72 for coke deposits to form before the fuel is burned in the combustor 20. In any event, even where the fuel is fully de-oxygenated, the fuel may pyrolyse if heated to a temperature above the pyrolysis temperature.

Figure 2A:
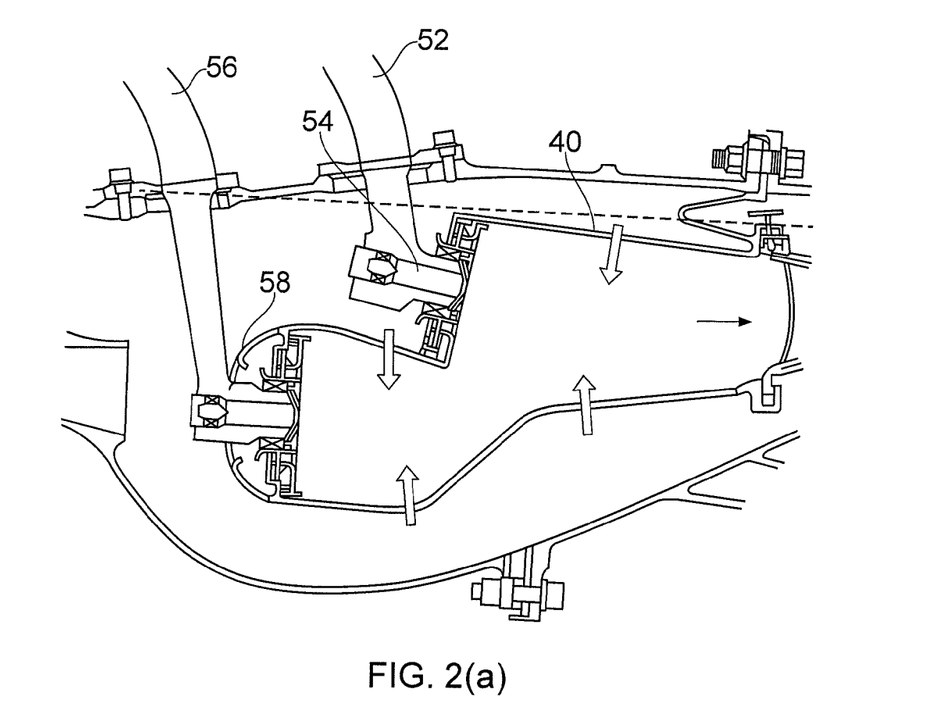
FIG. 2(a) is a diagrammatic view of a first type of staged combustor of the gas turbine engine of FIG. 1
Figure 2B:
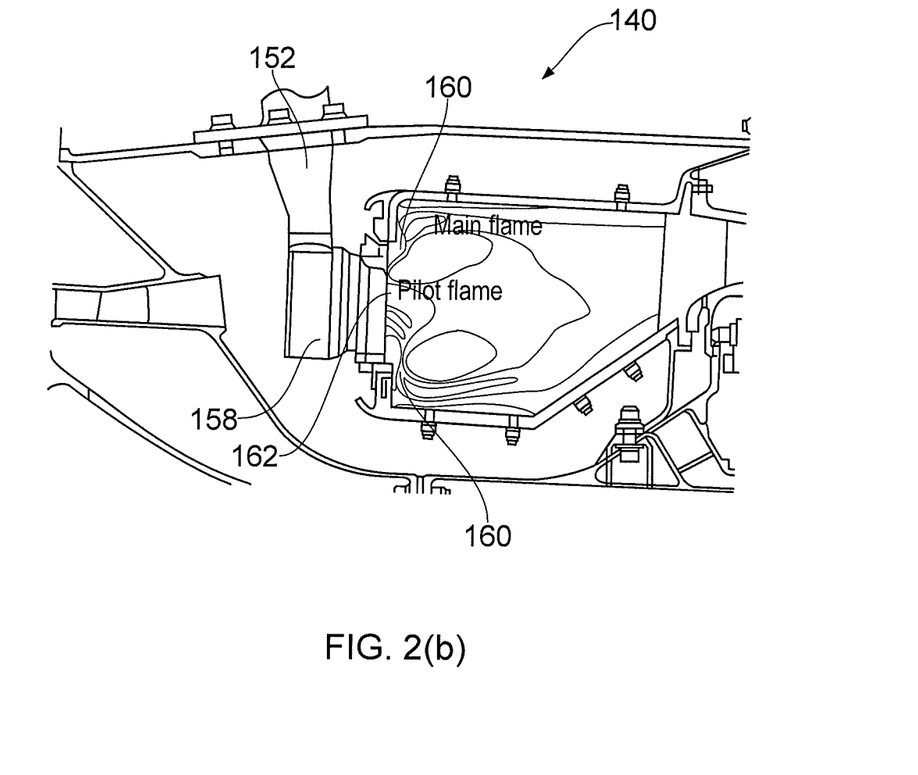
FIG. 2(b) is a similar view to that of FIG. 2(a), but of a second type of stage combustor.

This problem is particularly pronounced where the gas turbine engine 10 includes a staged combustor, such as the combustor 40 shown in FIG. 2(a), and the combustor 140 shown in FIG. 2(b).

In staged combustors 40 of the type shown in FIG. 2(a), a first fuel line 52 is provided for a primary, or main fuel injector 54, and a secondary fuel line 56 is provided for a secondary, or pilot fuel injector 58. Fuel constantly flows through the secondary line 56 during engine operation at all conditions. However, during certain engine conditions such as low power operation, fuel flow in the primary fuel line 52 is reduced or cut off. During such conditions, fuel may remain in the primary fuel line 52 for relatively long periods, resulting in significant re-oxygenation.

In staged combustors of the type shown in FIG. 2(b), the combustor 140 comprises a single fuel line 152, which provides fuel to a single injector 158. The injector 158 comprises primary and secondary outlet ports 160, 162. Fuel flows constantly through the secondary outlet port 162 to provide a pilot flame at all engine conditions, and through the primary outlet port 160 to provide a main flame only at certain engine conditions. The primary outlet port 160 is provided concentrically outwardly of the secondary outlet port 162.

After the fuel passes through the de-oxygenator 72, the fuel in the fuel line 66 is then pumped by a high pressure pump 74 to an inlet of a hydromechanical unit 76. The hydromechanical unit 76 acts as a valve to moderate fuel flow to the combustor 20 in accordance with operational requirements such as required thrust.

Figure 4:
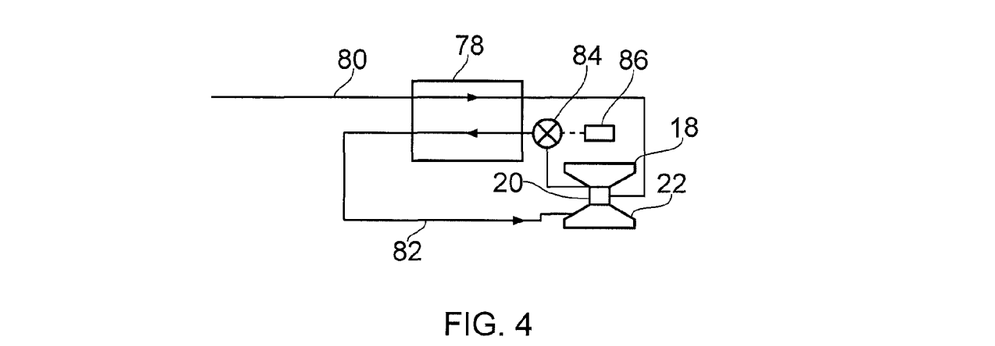
FIG. 4 is a detailed diagram of part of the cooling system of FIG. 3.

The fuel in the fuel line 66 is then passed to a fuel air heat exchanger 78, as shown in greater detail in FIG. 4.

The fuel air heat exchanger 78 comprises a heat exchange matrix comprising at least one fuel line 80 configured to provide fuel from the fuel line 66 to the combustor 20 (which could be of any suitable type, including a conventional stoichiometric, rich burn or lean burn combustor, and a staged combustor or lean burn combustor such as those shown in FIGS. 2(a) and 2(b)), and at least one air passage 82 configured to provide cooling air to an engine component. In the embodiment shown in FIG. 3, the cooling air is provided by the high pressure compressor 18 to cooling passages of the high pressure turbine 22, though in other embodiments, different cooling air sources could be used, such as the intermediate pressure compressor 16 or a low pressure compressor in a two-spool gas turbine engine. The fuel air heat exchanger 78 is configured to transfer heat from engine cooling air in the passage 82 delivered from the engine compressors 16, 18, to the fuel in the fuel passage 80.

The engine cooling air passage 82 comprises a valve 84. The valve 84 is configured to moderate the flow of engine cooling air through the heat exchanger 78 between at least a first rate and a second, relatively lower rate. The valve 84 could comprise any suitable type, and preferably comprises a fail-safe type, i.e. a valve that fails to the open position. Where a fail-safe valve is used, the cooling system could comprise a sensor (not shown) to indicate when the valve has failed to prevent overheating of the fuel in the fuel line 66, and therefore coking of the fuel when the valve 84 fails to the open position. The valve 84 could moderate the air flow between discrete first and second rates, or could be variable to moderate the air flow to rates intermediate the first and second rate. The first and second rates could correspond to open and closed positions, i.e. the second rate could be substantially zero, such that no air flows through the engine cooling air passage 82 when the valve 84 is closed.

The cooling system further comprises a control arrangement comprising a controller 86 configured to control the valve 84. The controller 86 both actuates the valve 84 between the open, closed and intermediate positions, and calculates whether to open or close the valve 84.

The controller 86 could operate the valve 84 as follows. The controller 86 continuously monitors a signal from a temperature sensor (not shown) indicating an engine temperature. Suitable engine temperatures include the high pressure turbine nozzle guide vane (HP NGV) total inlet temperature (T40), i.e. the temperature of the working fluid as it enters the high pressure HP NGV. However, a different temperature or a combination of temperatures could be used. Since this temperature is generally quite high, this may be difficult to measure in practice. As a result, T40 may be calculated by the controller 86 using one or more other engine parameters such as low pressure NGV temperatures.

The controller 86 closes or opens the valve 84 in response to the engine temperature. In one embodiment, the valve 84 would be closed when T40 falls below a predetermined value, and opened when T40 rises above the predetermined value. Alternatively, the controller 86 could vary the amount of cooling air flowing through the air passage 82 in accordance with T40. T40 has found to be highly representative of overall engine power conditions. Consequently, T40 has found to be an accurate indicator of fuel flow rate, with a high T40 indicating a correspondingly high fuel flow rate. This would in turn indicate that the both the pilot and mains injectors are in operation, so no stagnant fuel would be expected in the fuel line. As a result, the fuel in the fuel line will be less likely to exceed the critical temperature during these conditions, and the engine cooling air can safely be cooled using the fuel as a heat sink, without decomposing or coking the fuel. The cooling requirements of the cooled components would also be expected to be greater at higher T40, and lower at lower T40, and so controlling the valve 84 on the basis of this single parameter can be effectively used to provide cooled cooling air during certain engine conditions, while reducing the risk of decomposition of the fuel. Such a method of controlling is particularly (though not exclusively) suitable where the combustor comprises a staged combustor.

Alternatively or in addition, the controller 86 could be controlled as follows. The controller 86 continuously monitors a signal from a sensor (not shown) indicating fuel flow rate through the fuel passage 80. The controller 86 opens or closes the valve 84 in response to the fuel flow rate. For example, the valve 84 may be closed where the fuel flow rate falls below a predetermined value, and opened when the fuel flow rate increase above the predetermined value. By directly controlling the valve 84 in response to fuel flow rate, coking or pyrolysis may be more reliably avoided compared to where the valve 84 is controlled according to T40. Fuel flow rate could be determined by a direct measurement, or could be calculated on the basis of engine parameters, such as required thrust.

The controller 86 could also be controlled on the basis of fuel temperature. The controller 86 could continuously monitor a signal from a fuel temperature sensor 92 which indicates the temperature of the fuel in the fuel line. The controller 86 could then moderate the valve 84 to increase the air flow through the heat exchanger where the temperature of the fuel is relatively low, (i.e. significantly below the critical temperature) and reduce the air flow through the heat exchanger where the temperature of the fuel is relatively high (i.e. close to the critical temperature). However, the controller may also control the cooling air flow on the basis of temperature to avoid overcooling the component. In this case, the air flow would be decreased where the temperature falls below a first predetermined temperature (i.e. a minimum temperature), and increased where the temperature rises above the first predetermined temperature.

The critical temperature could be set at a predetermined level, which could for instance be the lower of the pyrolysis temperature and the coking temperature for deoxygenated fuel (typically around 150° C.). Alternatively, the cooling system could comprise an oxygen sensor 94 configured to sense the amount of oxygen dissolved in the fuel in the fuel line. The controller 86 would be in signal communication with the oxygenation sensor 94. The critical temperature could then be determined by the controller 86 on the basis of the amount of oxygen dissolved in the fuel in the fuel line 66, with the critical temperature being the lower of the coking temperature, and the pyrolysis temperature (i.e. around 371° C. for jet A1). In general, the critical temperature will be lower where the fuel in the fuel line contains relatively higher levels of dissolved oxygen.

The above control methods could be combined so that, for instance, the valve 84 is closed when either the fuel flow rate as determined by a fuel flow sensor 96 falls below a predetermined value, or T40 as determined by an air temperature sensor 98 falls below a predetermined value.

In a still further control method, the controller 86 could operate as follows. The controller 86 continuously monitors a signal from the fuel temperature sensor 92, and from the fuel flow rate sensor 96. Instead of using a fuel flow rate sensor 96, the fuel flow rate could be calculated on the basis of a throttle position sensor (not shown). The controller 86 would operate to close the valve 84 when the fuel temperature exceeds a first predetermined temperature close to or corresponding to the critical temperature (which may be set at a particular value, or calculated on the basis of dissolved oxygen in the fuel as described above). Where the fuel temperature is below the first predetermined temperature, and the engine is at high power conditions, the controller operates the valve 84 to maximize the cooling of the engine cooling air. However, at low power engine conditions (i.e. where fuel rate is determined to be below a predetermined rate), the controller 86 may operate the valve 84 to reduce the engine cooling airflow, to prevent the cooling air from being over-cooled by the fuel air heat exchanger 78 when the engine is throttled back, i.e. when the fuel flow is reduced further. Such a control method reduces transient thermal stresses on turbine disc features, and thereby increases disc life. However, it may not be necessary to monitor fuel flow to operate the valve 84 in some cases, as controlling the valve 84 using monitoring of the fuel temperature alone may prevent overcooling of the engine cooling air.

Figure 5:
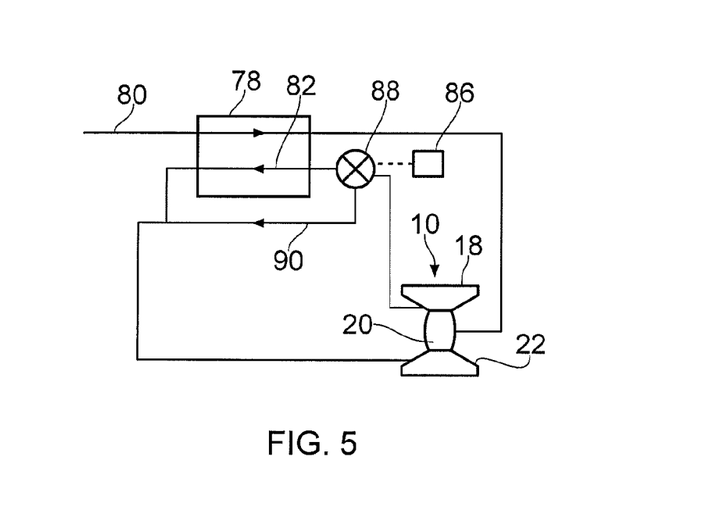
FIG. 5 is a similar view to FIG. 4, but of a first alternative cooling system.

FIG. 5 shows part of a first alternative cooling system. In this embodiment, the valve 84 is replaced by a bypass valve 88. The bypass valve 88 is configured to moderate the engine cooling air flow through the engine cooling air passage 82 by redirecting some or all cooling air flow through a bypass 90. The valve 88 is operated according to a similar method to the valve 84. However, in this arrangement, engine cooling air can still be passed to the turbines 22, 24, 26 even where the engine cooling air to the fuel air heat exchanger is reduced. Such an arrangement might be appropriate where the air cooled turbine 22, 24, 26 requires engine cooling air even where the engine 10 is operated at low power. Furthermore, such an arrangement can provide more effective cooling by cooling a smaller mass of air to a lower temperature, rather than a larger mass of air to a relatively higher temperature. In some embodiments, air exiting the bypass flow could be directed to different air cooled components than air exiting the heat exchanger. In order to provide high reliability and operational safety, the valve 88 could be designed such that, if it fails, the valve 88 cannot block off both passages 80, 90. For example, the valve 88 could be arranged to fail to the bypass position, such that cooling air is bypassed on failure of the valve 88. This ensures that cooling air continues to flow to the air cooled components (such as the turbine 22, 24, 26) even where the valve 88 fails, without causing overheating of the fuel.

Figure 6:
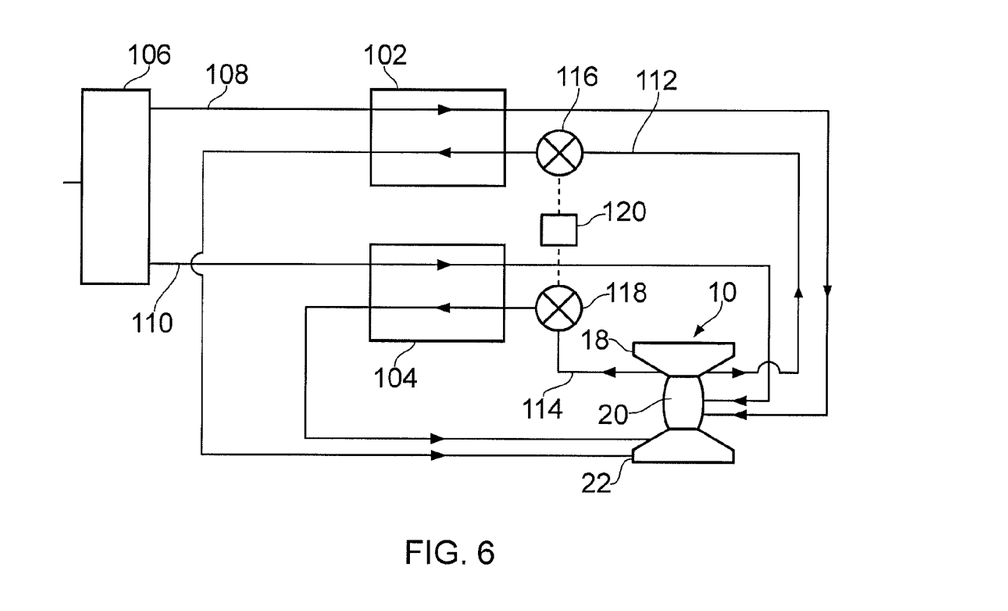
FIG. 6 is a similar view to FIG. 4, but of a second alternative cooling system.

FIG. 6 shows a second alternative cooling system suitable for a staged combustor 40 having main 54 and pilot 58 injectors fed by primary 52 and secondary 56 fuel passages such as that shown in FIG. 2(*a*). In this embodiment, the cooling system comprises an HMU 106 having an inlet for receiving fuel from the fuel line 66. However, the HMU 106 differs from the HMU 76 of the first and second embodiments, in that it includes first and second outlets leading to respective primary and secondary fuel passages 108, 110.

The cooling system comprises first and second fuel air heat exchangers 102, 104. Each heat exchanger 102, 104 comprises a heat exchange matrix comprising at least one fuel passage configured to provide fuel from respective primary and secondary fuel passage 108, 110 to the combustor. The primary fuel passage 108 provides fuel to the main injector 54, while the secondary fuel passage 110 provides fuel to the pilot injector 58. Each heat exchange matrix further comprises at least one engine cooling air passage 112, 114 configured to provide air from the high pressure compressor 18 to the high pressure turbine 22.

Each respective engine cooling air passage 82 comprises a respective valve 116, 118, each of which is controlled by a common controller 120. Each valve 116, 118 is configured to independently moderate the flow of engine cooling air through the respective heat exchanger 102, 104 between at least a first rate and a second, relatively lower rate. By independently moderating engine cooling air to a respective heat exchanger 102, 104, this embodiment can independently control air flow in contact with each fuel flow 108, 110. For example, engine cooling air flow can therefore continue to be cooled using fuel flowing through the secondary fuel passage 110 even where the fuel flow in primary fuel passage 108 is shutoff.

The invention therefore provides an improved cooling system which can reduce or eliminate the risk of coking during low power conditions. While the invention can be applied to gas turbine engines comprising conventional rich burn combustors, the invention is particularly suitable to staged lean burn combustors having a main injector and a pilot injector. This is because the fuel flow in the main injector may become stagnant (i.e. have very low or substantially no flow) during low power engine conditions. As a result, a smaller amount of fuel will generally flow through the fuel exchange matrix during a given time period, which may result in a larger amount of heat being transferred to the fuel in the primary fuel line, resulting in higher temperatures. In addition, the fuel may remain in the fuel line for a longer period, thereby resulting in the fuel reabsorbing a larger quantity of oxygen, thus lowering the coking temperature. By providing a valve for moderating the engine cooling airflow provided to the heat exchanger, heating of the fuel to a temperature above the coking temperature prior to combustion in the combustor can be avoided.

While the invention has been described in relation to particular embodiments, various changes may be made without departing from the scope of the invention. For example, a different type of fuel de-oxygenator could be used. The invention may also be suitable for other types of gas turbine engine, such as stationary gas turbines which provide mechanical power to an electrical generator instead of a fan. The invention may also be suitable for internal combustion engines having fuel air heat exchangers for providing cooled engine cooling air. The valve could be operated according to measured engine conditions other than, or in addition to, fuel flow, fuel temperature and nozzle guide vane temperature. For example, the valve could be operated according to engine cooling air temperature, throttle setting, or other engine conditions that would be predicted to result in stagnant fuel in one or more fuel line such that coking might occur. A plurality of heat exchangers could be provided in order to provide redundancy.

The invention claimed is:

1. A gas turbine engine comprising:
   a staged combustor comprising a primary fuel injector and a secondary fuel injector;
   a turbine having cooling passages;
   an air line configured to provide engine cooling air to the cooling passages of the turbine;
   a fuel line configured to provide fuel to the primary fuel injector and the secondary fuel injector of the combustor;
   a first fuel air heat exchanger configured to exchange heat from the engine cooling air in the air line to fuel in the fuel line;
   a fuel deoxygenator that is located upstream of the fuel air heat exchanger and that is configured to deoxygenate fuel in the fuel line;
   a bypass passage configured to direct the engine cooling air around the fuel air heat exchanger;
   a bypass valve configured to moderate engine cooling air flow rate through the fuel air heat exchanger and to moderate engine cooling air flow rate through the bypass passage, the bypass valve being upstream of the fuel air heat exchanger and the bypass valve being in fluid communication with the fuel air heat exchanger;
   a temperature sensor configured to detect turbine inlet temperature; and
   an electronic controller in signal communication with the temperature sensor configured to:
   i) control the bypass valve according to the turbine inlet temperature to moderate air flow rate to maintain fuel temperature in the fuel line below a critical temperature,
   ii) control the bypass valve such that the electronic controller provides instructions to the bypass valve to increase the engine cooling air through the heat exchanger when the fuel is below the is below the critical temperature, and
   iii) maintain the fuel temperature below a critical temperature by reducing the engine cooling air through the heat exchanger.

2. The gas turbine engine according to claim 1, wherein the critical temperature comprises a fuel oxidation temperature or a fuel pyrolysis temperature.

3. The gas turbine engine according to claim 2, wherein the fuel oxidation temperature is at least partly dependent on the amount of dissolved oxygen in the fuel.

4. The gas turbine engine according to claim 1, wherein the amount of oxygen dissolved in the fuel is at least partly dependent on flow rate of the fuel through the fuel line.

5. The gas turbine engine according to claim 1, wherein:
   the controller further comprises one or more of an engine core air flow sensor, a fuel flow rate sensor, and a fuel oxygen sensor, and
   the controller is configured to control the bypass valve in response to any of a fuel temperature, an engine core air flow temperature, a nozzle guide vane inlet temperature, a high pressure nozzle guide vane inlet temperature, a flow rate through the fuel line, and the amount of oxygen dissolved in fuel flowing through the fuel line.

6. The gas turbine engine according to claim 1, further comprising:
   a second fuel air heat exchanger, wherein
   the fuel line comprises a primary fuel line and a secondary fuel line, the first fuel air heat exchanger comprises the primary fuel line configured to provide fuel to the primary fuel injector, the second fuel air heat exchanger comprises the secondary fuel line configured to provide fuel to the secondary fuel injector, the primary fuel line is in thermal contact with a primary air line, and the gas turbine engine comprises a primary valve configured to moderate the flow of engine cooling air through the primary air line.

7. The gas turbine engine according to claim 1, wherein the bypass valve is configured to switch air flow between the fuel air heat exchanger and the bypass passage.

8. A method of moderating an airflow rate in a gas turbine engine, the gas turbine engine comprising:

a staged combustor comprising a primary fuel injector and a secondary fuel injector;

a turbine having cooling passages;

an air line configured to provide engine cooling air to the cooling passages of the turbine;

a fuel line configured to provide fuel to the primary fuel injector and the secondary fuel injector of the combustor;

a fuel air heat exchanger configured to exchange heat from the engine cooling air in the air line to fuel in the fuel line;

a fuel deoxygenator that is located upstream of the fuel air heat exchanger and that is configured to deoxygenate fuel in the fuel line;

a bypass passage configured to direct the engine cooling air around the fuel air heat exchanger;

a bypass valve configured to moderate the engine cooling air flow rate through the fuel air heat exchanger and to moderate engine cooling air flow rate through the bypass passage, the bypass valve being upstream of the fuel air heat exchanger and the bypass valve being in fluid communication with the fuel air heat exchanger;

a temperature sensor configured to detect turbine inlet temperature; and an electronic controller, the method comprising:

monitoring are turbine inlet temperature by the temperature sensor; and moderating engine cooling air flow through the fuel air heat exchanger according to the turbine inlet temperature to maintain fuel temperature in the fuel line below a critical temperature, and additionally controlling the bypass valve such that that an electronic controller provides instructions to the bypass valve to increase the engine cooling air through the heat exchanger when the fuel is below the is below the critical temperature while also maintaining the fuel temperature below the critical temperature by reducing the engine cooling air through the heat exchanger.

9. The method according to claim 8, wherein the method comprises controlling the bypass valve in response to engine conditions comprising one or more of an engine component, a nozzle guide vane inlet temperature, a fuel flow rate through the fuel line, and a temperature of the fuel flowing through the fuel line.

10. The method according to claim 9, wherein the method comprises reducing the engine cooling air flow when fuel flow in the fuel line falls below a first predetermined value, and increasing the engine cooling air flow when the fuel flow in the fuel line rises above a second predetermined value.

11. The method according to claim 9, wherein the method comprises increasing the engine cooling air flow when fuel temperature in the fuel line falls below a first predetermined value, and reducing the engine cooling air flow when the fuel flow in the fuel line rises above a second predetermined value.

12. The method according to claim 8, wherein the method comprises moderating the air flow rate through the fuel air heat exchanger with the bypass valve.

\* \* \* \* \*